United States Patent
Imano

(10) Patent No.: US 10,186,017 B2
(45) Date of Patent: Jan. 22, 2019

(54) CONSTRUCTION MACHINERY

(71) Applicant: Caterpillar SARL, Geneva (CH)

(72) Inventor: Toru Imano, Tokyo (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 15/673,627

(22) Filed: Aug. 10, 2017

(65) Prior Publication Data

US 2018/0061007 A1    Mar. 1, 2018

(30) Foreign Application Priority Data

Aug. 25, 2016 (JP) ................. 2016-164312

(51) Int. Cl.
| | | |
|---|---|---|
| *G06T 3/40* | (2006.01) | |
| *G06T 7/11* | (2017.01) | |
| *G06T 7/13* | (2017.01) | |
| *G06T 7/174* | (2017.01) | |
| *B60R 1/00* | (2006.01) | |
| *E02F 9/26* | (2006.01) | |
| *G06T 11/60* | (2006.01) | |
| *H04N 5/232* | (2006.01) | |
| *H04N 5/247* | (2006.01) | |
| *E02F 3/32* | (2006.01) | |

(52) U.S. Cl.
CPC .............. *G06T 3/4038* (2013.01); *B60R 1/00* (2013.01); *E02F 9/261* (2013.01); *G06T 7/11* (2017.01); *G06T 7/13* (2017.01); *G06T 7/174* (2017.01); *G06T 11/60* (2013.01); *H04N 5/23238* (2013.01); *H04N 5/23293* (2013.01); *H04N 5/247* (2013.01); *B60R 2300/105* (2013.01); *B60R 2300/303* (2013.01); *B60R 2300/306* (2013.01); *B60R 2300/607* (2013.01); *E02F 3/32* (2013.01); *G06T 2207/20192* (2013.01); *G06T 2207/20221* (2013.01); *G06T 2207/30261* (2013.01)

(58) Field of Classification Search
CPC .. G06T 11/00; E02F 3/00; E02F 9/261; B06R 2300/60; B06R 2300/607; G06K 9/20
USPC ........................................................ 345/641
See application file for complete search history.

(56) References Cited

U.S. PATENT DOCUMENTS

| | | | | |
|---|---|---|---|---|
| 9,862,319 B2* | 1/2018 | Miyoshi | ................... | B60R 1/00 |
| 2004/0085447 A1* | 5/2004 | Katta | ..................... | H04N 7/181 |
| | | | | 348/143 |
| 2013/0010118 A1* | 1/2013 | Miyoshi | .................. | B60R 1/00 |
| | | | | 348/148 |

(Continued)

FOREIGN PATENT DOCUMENTS

JP         2012-074929 A      4/2012

*Primary Examiner* — Sae Won Yoon

(57) ABSTRACT

A construction machine includes image processing means coupled in communication with a monitor. The image processing means is configured to receive images from a plurality of cameras; synthesize the images into a synthetic bird's eye view image; divide the synthetic bird's eye view image into four sections that are defined by a first section line and a second section line, the four sections including a first section, a second section, a third section, and a fourth section; generate a conversion image from the synthetic bird's eye view image by increasing a size of the first section and decreasing a size of each of the second section and the third section; and selectively display the conversion image on the monitor.

3 Claims, 6 Drawing Sheets

(56) References Cited

U.S. PATENT DOCUMENTS

| | | | | |
|---|---|---|---|---|
| 2014/0059461 A1* | 2/2014 | Kim | ........................ | G06T 5/50 |
| | | | | 715/769 |
| 2014/0111648 A1* | 4/2014 | Ishimoto | .................. | B60R 1/00 |
| | | | | 348/148 |
| 2015/0138356 A1* | 5/2015 | Kowatari | .................. | B60R 1/00 |
| | | | | 348/144 |
| 2015/0185585 A1* | 7/2015 | Kawai | ................ | H04N 5/23212 |
| | | | | 348/333.11 |
| 2016/0205319 A1* | 7/2016 | Oota | ................ | H04N 5/23238 |
| | | | | 348/38 |
| 2017/0066375 A1* | 3/2017 | Kato | ..................... | H04N 7/181 |

\* cited by examiner

CONSTRUCTION MACHINERY

TECHNICAL FIELD

The present disclosure relates to the construction machinery equipped with the plural number of monitor cameras that film the surrounding of the machine body, and a monitor that displays camera images filmed by each monitor camera.

BACKGROUND

A hydraulic excavator which is a representative example of construction machinery is equipped with a machine body configured by a base carrier and an upper turning body mounted on the base carrier, and a work arm device installed on the upper turning body. The cab where a driver boards is in general positioned on the left front part of the upper turning body, hence the driver can visually recognize a comparatively wide range about the front of the machine body and the left side of the machine body. On the other hand, the driver can hardly visually recognize the back of the machine body and the right side of the machine body. Because of this, a hydraulic excavator in recent years is equipped with a rear monitor camera that films the rear of the machine body in the rear of the machine body and also, a right-side monitor camera on the right side of the machine body that films the right side of the machine body and there exists one that camera images filmed by each monitor camera are displayed in the monitor inside the cab.

Thereby the driver can confirm safety through the monitor if there are obstacles or workers in the rear of the machine body or on the right side of the machine body. Moreover, as to the monitor display of camera images, in addition to those that are displayed with each camera image lined up side by side, there are those that display on the monitor the synthetic bird's eye view image that has bird's eye view of the surrounding of the machine body from above the machine body by synthesizing each camera image. (for instance, refer to Japanese Unexamined Patent Application 2012-74929).

Regarding the construction machinery in which the images of the surrounding of the machine body (particularly synthetic bird's eye view image) it has become a challenge to enable obstacles and other workers to be surely recognized by the drivers from monitor camera images. To solve this challenge, one can consider to make the camera images on the monitor to be larger using a larger monitor than conventional ones. However, since the monitor in a cab is positioned in front of the driver seat, if the monitor is made larger, a concern is that the frontal visibility of the driver deteriorates, hence there is a limit in making the monitor larger.

On the other hand, in the published unexamined Japanese application is disclosed a technology in which among the synthetic bird's eye view images, an optional area only is expanded and displayed on the monitor. However, the driver cannot recognize from the expanded display where only the optional area is expanded whether or not obstacles or other workers exist in the other areas. Moreover, to expand display or cancel the expanded display, it requires that the driver operate the monitor manually, hence every time the driver expands display or cancels the expanded display, the driver has to remove his hands from the operating lever, hence it is inferior in workability.

An object the present disclosure in view of the problems described above is to provide construction machinery that does not make the monitor larger, but in which the driver can certainly recognize whether or not obstacles or other workers exist in all areas surrounding the machine body.

SUMMARY

In order to solve the challenge described above, the present disclosure provides the following construction machinery. That is, a construction machine is equipped with a plurality of monitor cameras that capture the surrounding of the machine body; image processing means that synthesizes the plural number of camera images filmed by each of the aforementioned monitor cameras and generates synthetic bird's eye view images, then divides the aforementioned synthetic bird's eye view images into the plural number of section by one or more section lines, and expands the specified area size among the aforementioned plural number of areas and at same time, changes the area size other than aforementioned specified area among the aforementioned plural number of areas in response to the expansion of the aforementioned specified area and generates conversion images of the same size as the aforementioned synthetic bird's eye view images; a monitor that selectively displays aforementioned synthetic bird's eye view images and aforementioned conversion images.

Preferably, in the center part of the aforementioned synthetic bird's eye view images is positioned a plan figure of the aforementioned machine body, and the aforementioned section line is configured by a first section line that extends from front to back along one side end of the aforementioned plan figure and a second section line that extends right to left at one end of the aforementioned plan figure.

According to the construction machine provided by the present disclosure, by displaying on the monitor the conversion image with a specified area expanded, without making the monitor larger, the driver can surely recognize whether or not obstacles or other workers exist in the actual work area that corresponds to the specified area expanded in the conversion image.

Moreover, according to the construction machine of the present disclosure, although the size is changed, since the area other than the specified area is contained in the conversion image, the driver can surely recognize whether or not obstacles or other workers etc exist in the actual work area that corresponds to the area other than the specified area in the conversion image.

DETAILED DESCRIPTION

The following uses an example of a hydraulic excavator as a representative construction machine and explains while referring to drawings, about an embodiment of a construction machinery configured according to the present disclosure.

Figure 1:
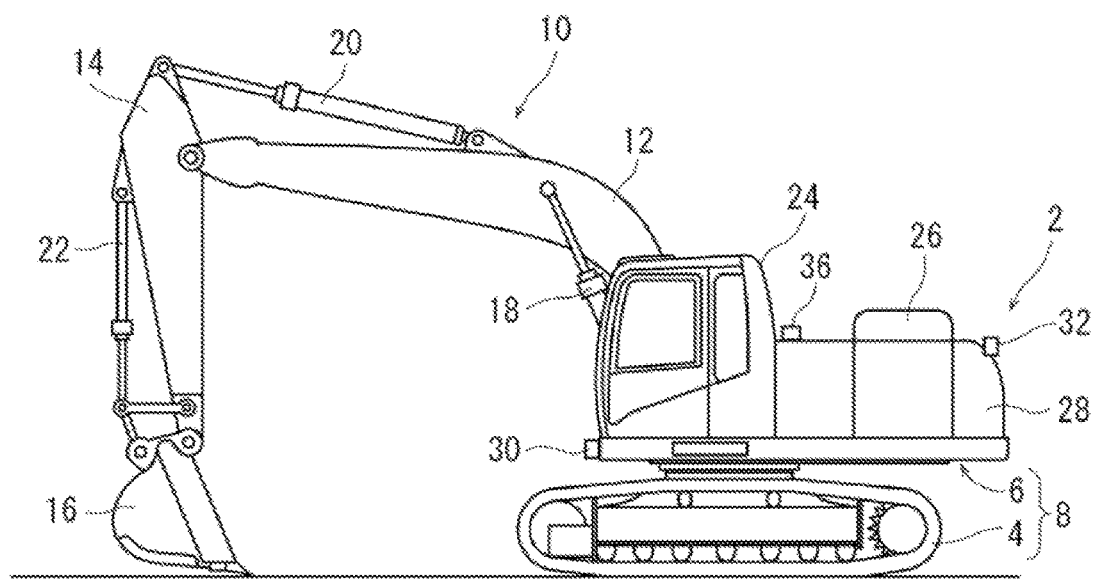
FIG. 1 is a side surface drawing of a hydraulic excavator configured according to the present disclosure

The hydraulic excavator 2 in FIG. 1 is equipped with a machine body 8 comprising a base carrier 4, an upper rotation body 6 installed rotatably on the base carrier 4, and a work arm 10 installed on the upper rotation body 6. The work arm 10 includes a boom 12, an arm 14, and a work tool 16. The base end of a boom 12 is connected rotatably to the front of the upper rotation body 6; the base end of an arm 14 to the front end of the boom 12; and a work tool 16 to the front end of the arm 14, respectively. Work arm 10 furthermore includes a boom cylinder 18 that enables boom 12 to rotate; an arm cylinder 20 that enables arm 14 to rotate; and a work tool cylinder 22 that enables work tool 16 to rotate.

Figure 2:
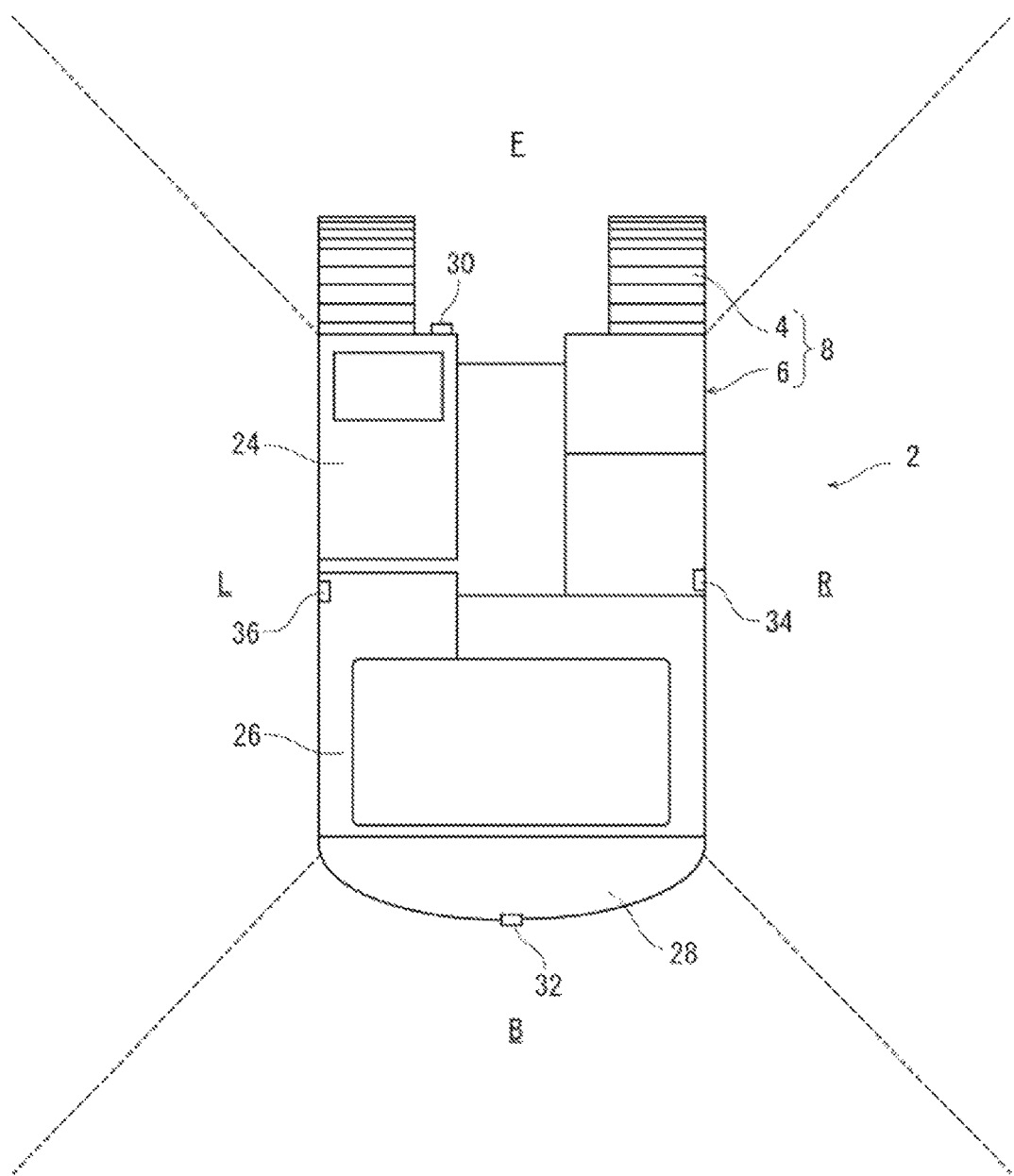
FIG. 2 is a plan view of the hydraulic excavator shown in FIG. 1 (work arm device is omitted)

Referring now to FIG. 1 and FIG. 2, the upper rotation body 6 includes a cab 24 positioned in the left front part of the upper rotation body 6, an engine housing 26 positioned to the rear of the cab 24, and a counterweight 28 positioned to the rear of the engine housing 26. Moreover, on the upper rotation body 6 are installed a plurality of monitor cameras that capture images of the area surrounding the machine body 8. As shown in FIG. 2, the monitor cameras comprise a front monitor camera 30 installed on the right front lower end of the cab 24; a rear monitor cameras 32 installed on the center, upper end of counterweight 28; a right side monitor camera 34 installed on the right side of the upper rotation body 6 centered in the front and back direction; a left side monitor camera 36 installed on the left side of upper rotation body 6 also centered in the front and back direction. The range captured by the front monitor camera 30 is shown as area F; the range captured by the rear monitor camera 32 is shown by the area B; the range captured by the right side monitor camera 34 is shown by the area R; and the range captured by the left side monitor camera 36 is shown by area L, all respectively in FIG. 2. Each area F, B, R, L is illustrated by dotted lines in FIG. 2, but the ranges captured by each monitor camera 30, 32, 34, 36 can mutually overlap. Moreover, the front and back directions and right and left directions used in this specification are those seen from the driver boarded inside the cab 24.

Figure 3:
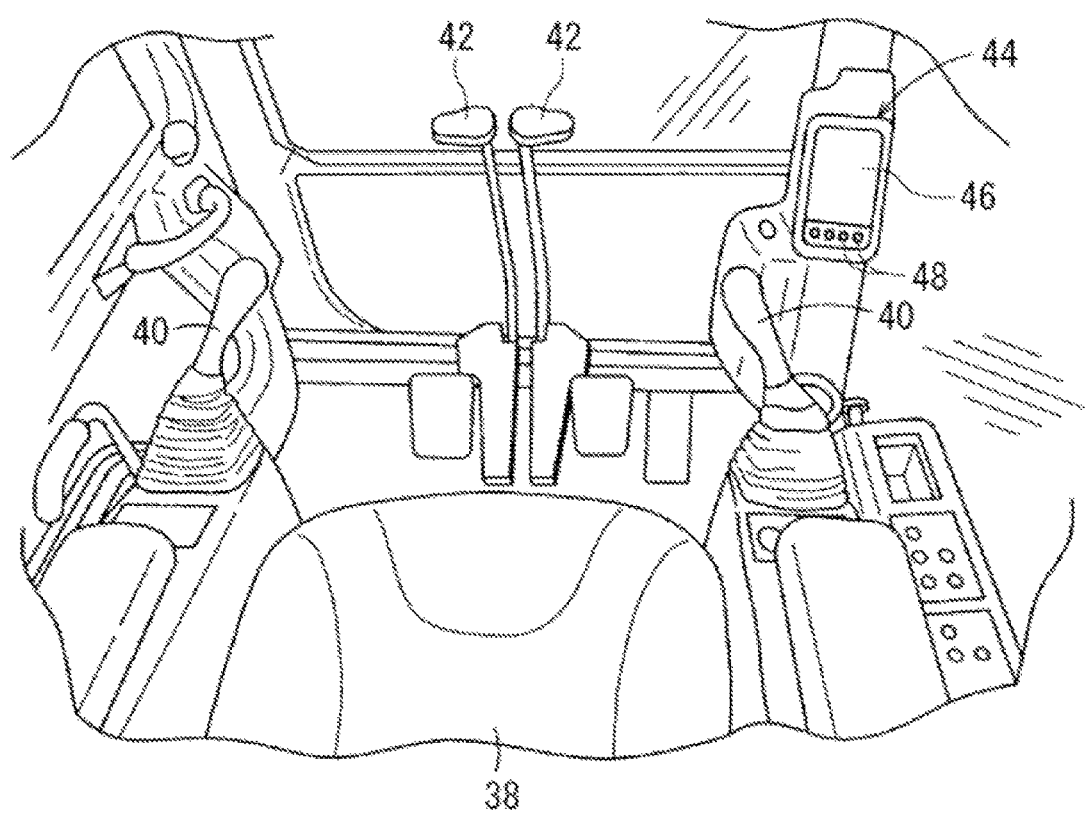
FIG. 3 is a perspective view of the inside of the cab shown in FIG. 1

As shown in FIG. 3, a seat 38 for a driver is provided in the cab 24. On both right and left sides of seat 38 is provided a pair of joysticks 40 free to oscillate in all directions of 360 degrees that includes a cross letter shaped direction that consists of the back and front and left and right directions. In front of the seat 38 is positioned a pair of traveling levers 42 free to oscillate in back and front directions. In the right front direction of seat 38 is positioned a monitor 44 that displays various images. On the screen 46 of the monitor 44 is selectively displayed a processed image in which the image processing means 50 later described provides image processing to the camera images captured by each monitor camera 30, 32, 34, 36 (synthetic bird's eye view image later described and conversion image 60), machine information images such as remaining fuel amount, hydraulic oil temperature and engine cooling water temperature, and operation images for displaying maintenance information regarding hydraulic excavator 2. In the lower side of screen 46, is positioned a plurality of switches 48 to manipulate the images displayed on screen 46.

Figure 4:
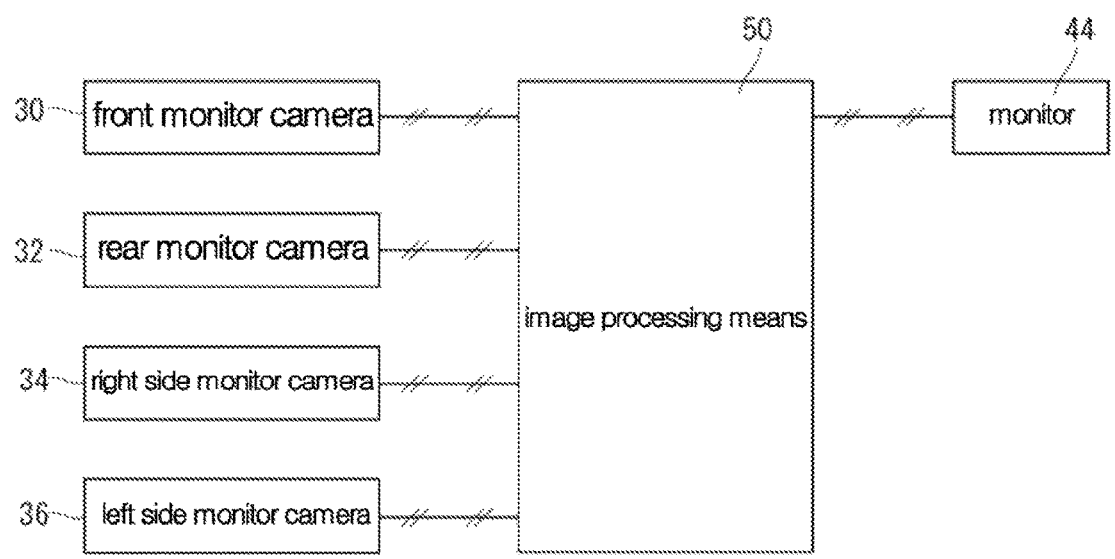
FIG. 4 is a block view showing an electrically configured part of a hydraulic excavator.
Figure 5A:
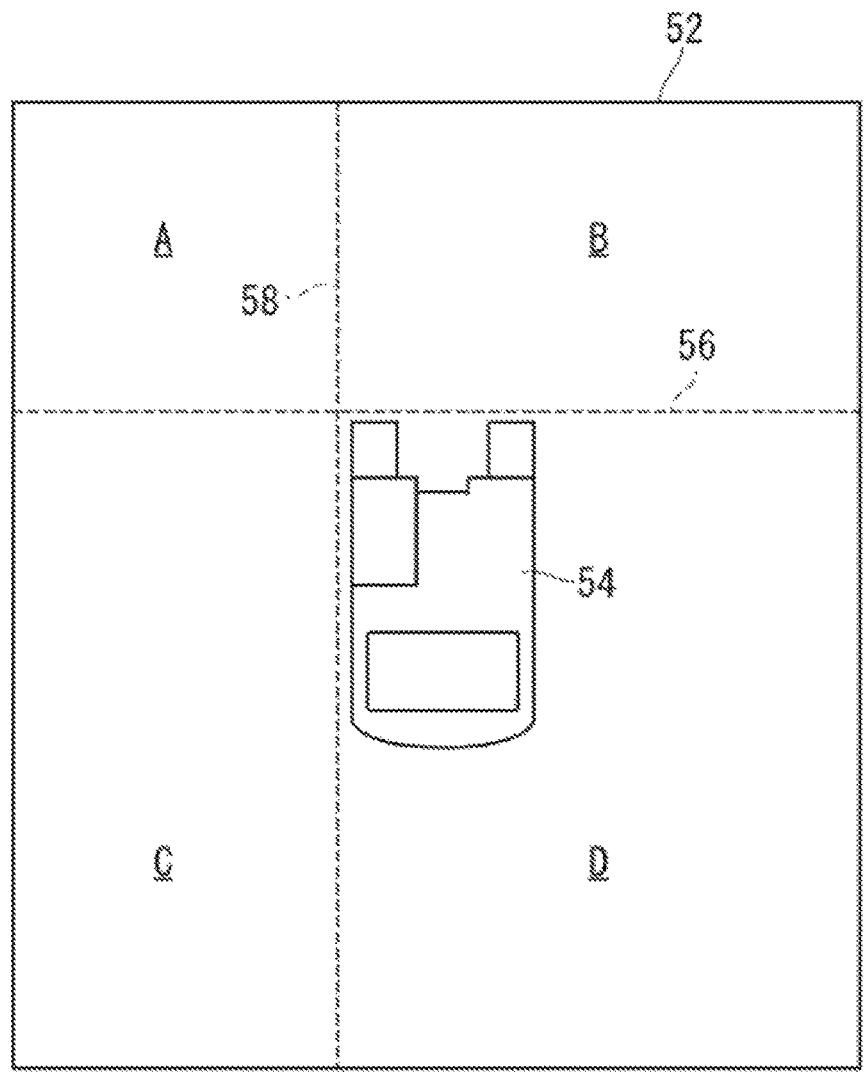
FIG. 5a is a schematic showing synthetic bird's eye view images.
Figure 5A:
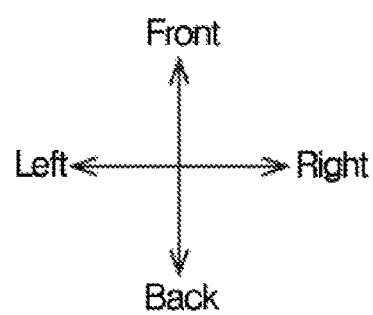
Figure 5B:
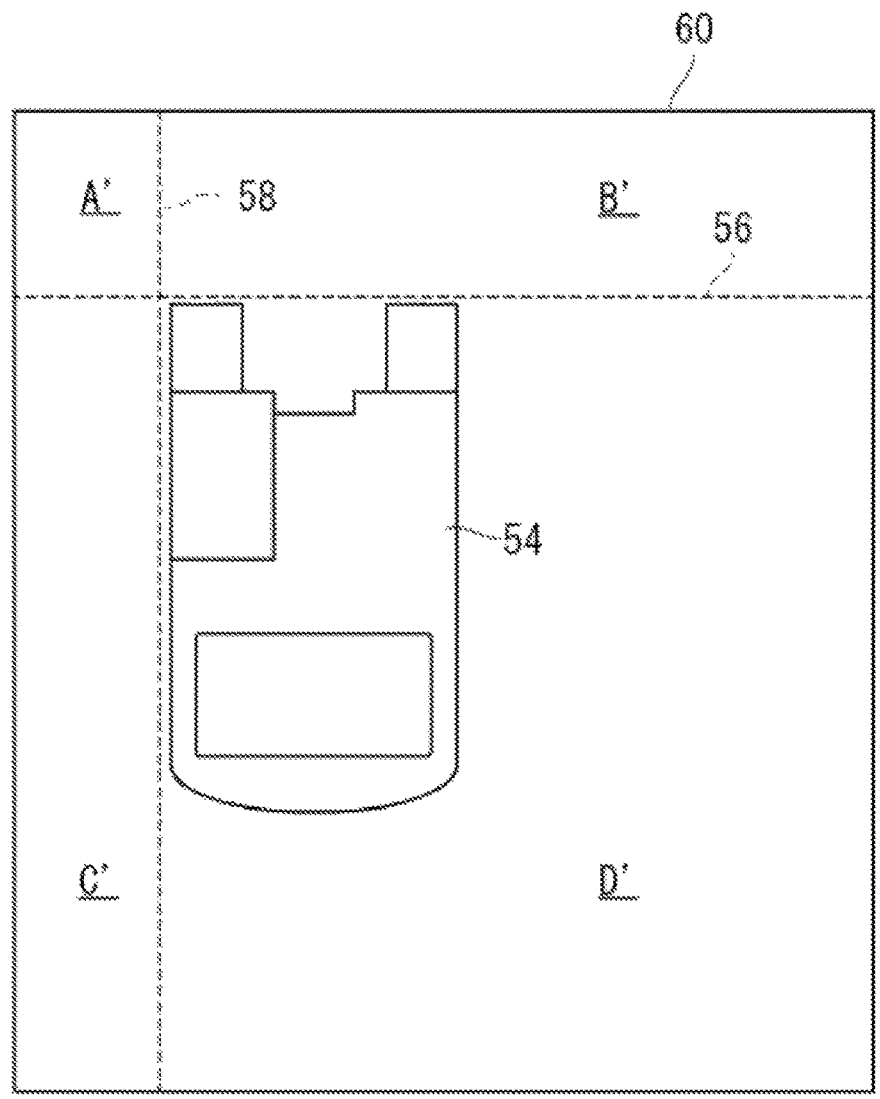
FIG. 5b is a schematic showing the conversion images.
Figure 5B:
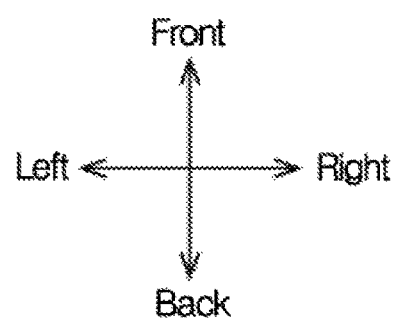

Hydraulic excavator 2 configured according to the present disclosure is equipped with image processing means 50 that provides image processing of each camera image captured by each monitor camera 30, 32, 34 and 36. As shown in FIG. 4, image processing means 50, which can be configured as a computer, is electrically connected to each monitor camera 30, 32, 34, 36, and the image information of each camera image captured by each monitor camera 30, 32, 34, 36 is input into image processing means 50. Moreover, the image processing means 50 is electrically connected to a monitor 44 in the cab 24, and the image information is output from image processing means 50 to a monitor 44.

Image processing steps executed by image processing means 50 are now explained. First, image processing means 50 synthesizes each camera image captured by each monitor camera 30, 32, 34, 36, 5, into a synthetic bird's eye view image 52 as shown in FIG. 5 of the area surrounding the machine body 8 as viewed from above. In the image processing means 50 is pre-stored a plan figure 54 of the machine body 8, which is displayed in the center of the synthetic bird's eye view image 52.

Next, the image processing means 50 divides synthetic bird's eye view image 52 into a plurality of areas by one or more section lines. Section lines are preferably configured as first section line 56 that extends in a right and left direction on a front end of the plan figure 54 of machine body 8, and a second section line 58 extending in a front to back direction on one side of plan figure 54, according to the embodiment shown in FIG. 5a. Then, synthetic bird's eye view image 52 is divided into the first area A, second area B, third area C and fourth area D by first section line 56 and 2nd section line 58. As understood by referring to FIG. 5, area D in plan figure 54 includes the backside and right side of the machine body 8 that are blind spots for the driver.

Next, the image processing means 50 expands the size of a specified area in the plural number of areas, and generates the conversion image of the same size as the synthetic bird's eye view image 52 by changing the size of the area other than the specified area among the plurality of areas in response to the expansion of the specified area. In the embodiment shown in the figure, the image processing means 50 expands the size of forth area D, and also reduces the size of the areas other than fourth area D, in order to generate a conversion image 60 with the same overall size as synthetic bird's eye view image 52. In detail, as area D of synthetic bird's eye view image 52 is expanded in both the front back and left right direction, the image of first area A is reduced in both the front back and left right directions to area A' of conversion image 60. The second area B of synthetic bird's eye view image 52, in response to the expansion of $4^{th}$ area D, the back and front size and right and left size both are shrunk and it is changed to $2^{nd}$ area B' of conversion image 60. Moreover, as to the $3^{rd}$ area C of synthetic bird's eye view image 52, in response to the expansion of $4^{th}$ area D, the back and front size are expanded, and the right and left direction size is shrunk and it is changed to the $3^{rd}$ area C' of the conversion image 60.

As described above, according to the present disclosure, the image processing means 50 provides image processing to the camera images filmed by each monitor camera 30, 32, 34, 36, and generates the synthetic bird's eye view image 52 and conversion image 60. The synthetic bird's eye view image 52 and conversion image 60, may be selectively displayed on screen 46 of the monitor 44 for instance by operating switch 48 of the monitor 44. When the synthetic bird's eye view image 52 or the conversion image 60 is displayed on screen 46, the upper rotation body direction of the plan figure 54 is always fixed, that is, the cab of plan figure 54 is positioned on the upper left side of screen 46, and the counterweight of plane figure 54 is always positioned on the lower side of screen 46. Moreover, as the actual upper rotation body 6 is rotated with respect to base carrier 4, in the synthetic bird's eye view image 52 or conversion image 60 displayed on screen 46, the base carrier of plan figure 54 is rotated with respect to the upper rotation body of plan figure 54.

In the embodiment shown, by displaying on the screen 46 of the monitor 44 the conversion image 60 in which fourth area D of the synthetic bird's eye view image 52 is expanded to D', without making the monitor 44 larger, the driver can surely recognize whether or not obstacles or other workers are present in the actual work area that corresponds to his blind spot expanded in conversion image 60. Moreover, in the embodiment shown, although the size is reduced, since the other areas A', B', and C' are included in conversion image 60, the driver can still also recognize whether or not obstacles or other workers are present in those actual work areas. In this way, the conversion image 60 includes the same area as synthetic bird's eye view image 52, permitting the driver to confirm by conversion image 60 the safety of the area that is normally a blind spot for the drivers, while still being able to view the remaining surrounding areas of machine body 8. Hence, it is not necessary for the driver to remove a hand from the joystick 40 or traveling lever 42 during work by hydraulic excavator 2 and switch back and forth between the synthetic bird's eye view image and expanded conversion image display in order to confirm the safety of all the areas surrounding the machine body 8, thus the workability is improved.

The invention claimed is:

1. A construction machine, comprising:
a plurality of monitor cameras that capture images of an area surrounding a body of the construction machine; and
image processing means coupled in communication with a monitor and the plurality of monitor cameras, the image processing means being configured to:
receive images from each camera of the plurality of monitor cameras;
synthesize the images into a synthetic bird's eye view image;
divide the synthetic bird's eye view image into four sections that are defined by a first section line and a second section line, each section of the four sections being bounded by both the first section line and the second section line,
the first section line intersecting with the second section line at an intersection point, a section line angle being defined between the first section line and the second section line, the four sections including a first section, a second section, a third section, and a fourth section;
generate a conversion image from the synthetic bird's eye view image by translating the intersection point within the synthetic bird's eye view image while maintaining the section line angle constant to increase a size of the first section and decrease a size of each of the second section and the third section, an overall size of the conversion image being the same as an overall size of the synthetic bird's eye view image; and
selectively display the conversion image on the monitor,
wherein the image processing means is further configured to superimpose an entirety of a predefined plan figure of the body of the construction machine in the first section of the synthetic bird's eye view image and the first section of the conversion image,
wherein the second section line extends in a back-to-front direction along a left side of the predefined plan figure, and the first section line extends in a right-to-left direction along a front side of the predefined plan figure, the back-to-front direction being transverse to the right-to-left direction, and
wherein the predefined plan figure includes a figure of a cab of the construction machine located at a left front part of the predefined plan figure.

2. The construction machine according to claim 1, wherein the image processing means is further configured to decrease a size of the fourth section when generating the conversion image.

3. The construction machine according to claim 1, wherein the first section is separated from the second section by the second section line,
the first section is separated from the fourth section by the first section line,
the third section is separated from the second section by the first section line, and
the third section is separated from the fourth section by the second section line.

* * * * *